United States Patent
Petrick et al.

(10) Patent No.: US 10,152,402 B2
(45) Date of Patent: Dec. 11, 2018

(54) SUPPORTING MULTIPLE STREAMS FOR A REDIRECTED USB DEVICE

(71) Applicant: Wyse Technology L.L.C., Santa Clara, CA (US)

(72) Inventors: Christopher Stephen Petrick, Cedar Park, TX (US); Gokul Thiruchengode Vajravel, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 3 days.

(21) Appl. No.: 15/433,377

(22) Filed: Feb. 15, 2017

(65) Prior Publication Data
US 2018/0232293 A1  Aug. 16, 2018

(51) Int. Cl.
| | |
|---|---|
| G06F 1/00 | (2006.01) |
| G06F 11/30 | (2006.01) |
| H04L 29/06 | (2006.01) |
| G06F 13/42 | (2006.01) |
| G06F 13/38 | (2006.01) |
| G06F 9/451 | (2018.01) |
| G06F 11/22 | (2006.01) |

(52) U.S. Cl.
CPC .......... *G06F 11/3051* (2013.01); *G06F 9/452* (2018.02); *G06F 11/3006* (2013.01); *G06F 11/3048* (2013.01); *G06F 13/385* (2013.01); *G06F 13/4282* (2013.01); *H04L 69/16* (2013.01); *G06F 11/2247* (2013.01)

(58) Field of Classification Search
USPC ........................................................ 710/8–19
See application file for complete search history.

(56) References Cited

U.S. PATENT DOCUMENTS

| | | | |
|---|---|---|---|
| 8,010,630 B2* | 8/2011 | Barreto | H04L 29/08846 709/219 |
| 2011/0083081 A1* | 4/2011 | Jaudon | G06F 9/455 715/743 |
| 2013/0019034 A1* | 1/2013 | Lida | H04L 12/2832 710/38 |
| 2014/0317418 A1* | 10/2014 | Lin | H04L 63/0471 713/190 |
| 2017/0031852 A1* | 2/2017 | Vajravel | G06F 13/36 |
| 2017/0063855 A1* | 3/2017 | Vajravel | H04L 67/42 |
| 2017/0109301 A1* | 4/2017 | Venkatesh | G06F 13/20 |
| 2017/0339234 A1* | 11/2017 | Vajravel | H04L 67/141 |

* cited by examiner

*Primary Examiner* — Raymond N Phan

(74) *Attorney, Agent, or Firm* — Kirton McConkie; Brian Tucker

(57) ABSTRACT

When a USB device that supports multiple streams is redirected, a multi-channel environment can be established in which each USB stream is associated with a separate network connection. As a result, each USB stream will be transferred over the network in its own connection and therefore the data transfer can be carried out in an out-of-order fashion and with speeds that better approximate those provided by the USB SuperSpeed feature. To handle the routing of URBs to the appropriate network connection, the virtual desktop infrastructure can implement a lookup table to associate a stream's handle with a particular network connection.

20 Claims, 21 Drawing Sheets

SUPPORTING MULTIPLE STREAMS FOR A REDIRECTED USB DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281*a*, 281*b*, . . . , 281*n*, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282*a*, 282*b*, . . . 282*n*, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281*a* stating that a new device has been plugged in. Next, a plug-and-play (PNP) component of the operating system will search for and load the best driver for device 240, which will create another device object 281*b* that is layered over the previous device object 281*a*. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( )including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

Traditional USB devices employ only a single stream of data during a transfer which is the primary factor that limits the speed of these devices. To address this issue, the USB 3.0 specification introduced the "SuperSpeed" feature which increases the transfer rate by at least a factor of 10 over traditional USB devices (i.e., USB 2.0 and earlier devices). This SuperSpeed transfer rate is accomplished by allowing a client driver to employ multiple streams to transfer data to/from a single bulk endpoint.

FIGS. 3A-3D illustrate an example of how USB 3.0 can be implemented in a redirection scenario. In accordance with the USB 3.0 standard, when a client driver (which will be represented generally as USB class driver 380 in FIG. 3 and can viewed as a component of device stack 280) desires to employ multiple streams to perform a transfer, must first open and obtain handles to the streams. This is accomplished by using an open-streams request (e.g., a request that includes the _URB_OPEN_STATIC_STREAMS URB) that specifies the number of streams to open as represented in FIG. 3A. The open-streams request will be routed to device 240 in the manner described above where it will be handled and an appropriate response returned.

If the open-streams request is completed successfully, USB class driver 380 will receive information about the streams such as a handle to each opened stream (which will be included in the USBD_STREAM_INFORMATION structures) as represented in FIG. 3B. With these handles, USB class driver 380 will then be able to transfer data over each stream. To do so, USB class driver 380 can receive (or allocate) a WDF request object representing the IRP and associate a data transfer URB with the request object. In addition to the URB being formatted for bulk transfer (by including the _URB_BULK_OR_INTERRUPT_TRANS-FER structure), USB class driver 380 must specify the handle to the particular stream in the _URB_BULK_OR_INTERRUPT_TRANSFER structure.

As shown in FIG. 3C, USB class driver 380 can pass the URBs (e.g., by calling WdfRequestSend or WdfUSBTarget-PipeSendUrbSynchronously). The primary benefit of using multiple streams is that the packets of the stream can be sent out of order (i.e., they are not serialized) but will still be handled appropriately once received at device 240 (or at any other targeted device whether locally connected or redirected). When the USB device is connected locally, this ability to send multiple streams increases the overall bandwidth for data transfers. However, this is not the case when the USB device is redirected.

As shown in FIG. 3D, virtual bus driver 260 will receive these URBs and will forward them to agent 250 for delivery to proxy 210. Agent 250 employs a single TCP socket connection to communicate redirection content with proxy 210, and therefore each of the URBs, regardless of which stream they target, will be tunneled over the same socket (i.e., they will be serialized). The same is true when the responses to the URBs are returned (e.g., when a read is performed). Also, TCP guarantees in order delivery and its performance can be greatly influenced by the size of the receive window and the latency of the link. As a result, much, if not all, of the benefit of using multiple streams to perform the transfer is negated when the URBs are sent over the TCP socket connection. Therefore, in practice, even if the SuperSpeed functionality is implemented in a redirection scenario, the actual performance approximates that of USB 2.0. For this reason, many redirection providers disable SuperSpeed support so that their customers will not be led to believe that there is something wrong with their USB infrastructure.

BRIEF SUMMARY

The present invention extends to methods, systems, and computer program products for supporting multiple streams for a redirected USB device. When a USB device that supports multiple streams is redirected, a multi-channel environment can be established in which each USB stream is associated with a separate network connection. As a result, each USB stream will be transferred over the network in its own connection and therefore the data transfer can be carried out in an out-of-order fashion and with speeds that better approximate those provided by the SuperSpeed feature. To handle the routing of URBs to the appropriate network connection, the virtual desktop infrastructure can implement a lookup table to associate a stream's handle with a particular network connection.

In one embodiment, the present invention is implemented in a virtual desktop infrastructure environment as a method for redirecting a USB device. A client-side proxy detects a successful request to open streams to a USB device. The proxy can identify, from the request, a number of streams to be opened, and then create, for each of the number of streams, a network connection. The proxy can also create a lookup table that associates each stream with a particular network connection.

In another embodiment, the present invention is implemented as computer storage media storing computer executable instructions which when executed by one or processors implement a virtual desktop infrastructure comprising a client-side proxy and a server-side agent. The proxy is configured to communicate over a network with the agent for the purpose of redirecting a USB device to the server including: detecting a successful request to open streams to the USB device; identifying, from the request, a number of streams to be opened; creating, for each of the number of streams, a network connection; creating a lookup table that associates each stream with a particular network connection; and sending the lookup table to the agent.

In another embodiment, the present invention is implemented as computer storage media storing computer executable instructions which when executed by one or processors implement a virtual desktop infrastructure comprising a client-side proxy and a server-side agent. The agent is configured to communicate over a network with the proxy for the purpose of redirecting a USB device to the server including: receiving, from the proxy, a lookup table that associates each of a number of network connections with a particular stream for the USB device; receiving a URB that is sent to a particular stream; access the lookup table to identify the network connection that is associated with the particular stream; and sending the URB over the identified network connection.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

The present invention can be implemented as part of a virtual desktop infrastructure (VDI) environment to redirect a USB device that supports SuperSpeed via a remote session. A remote session can be established using any remote display protocol including, for example, Microsoft's Remote Desktop Protocol (RDP), Citrix's Independent Computing Architecture (ICA), VMWare's PC-over-IP (PCoIP), Dell's vWorkspace (EOP), etc.

The present invention allows a bulk transfer to/from a redirected USB device to be carried out using multiple streams without the network connection being a bottleneck. When a bulk transfer that employs multiple streams (hereinafter a "multi-stream transfer") is attempted, the VDI can intercept communications containing information defining the streams and use this information to establish a network connection for each stream. The VDI can also create a lookup table that matches each stream to a particular network connection. Then, when a URB is received, the URB can be transferred over the network connection that is associated with the stream identified in the URB. In this way, each of the streams can be transferred separately over the network rather than being serialized over the same network connection.

Figure 1:
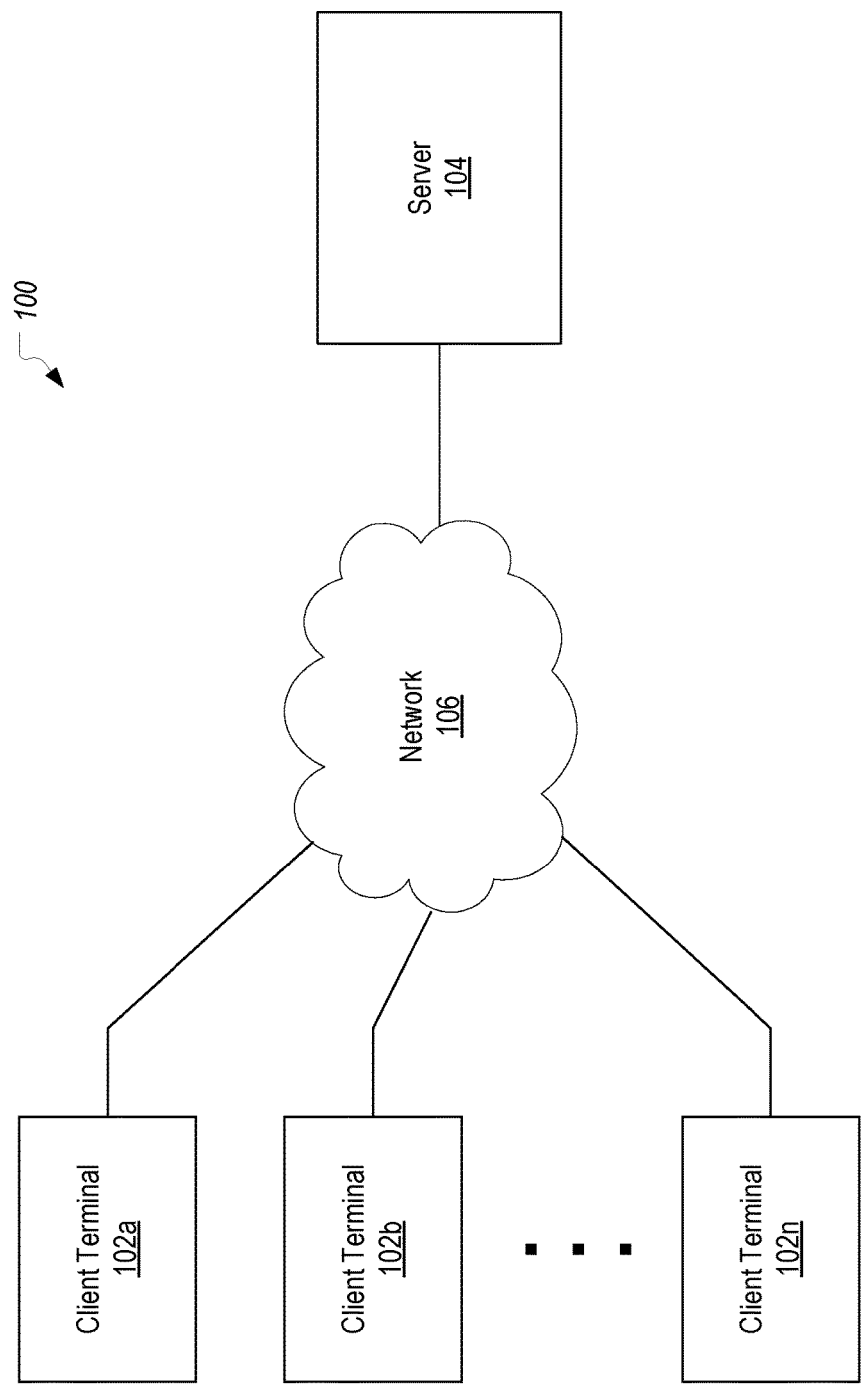
FIG. 1 illustrates an example computing environment in which the present invention can be implemented.
Figure 2:
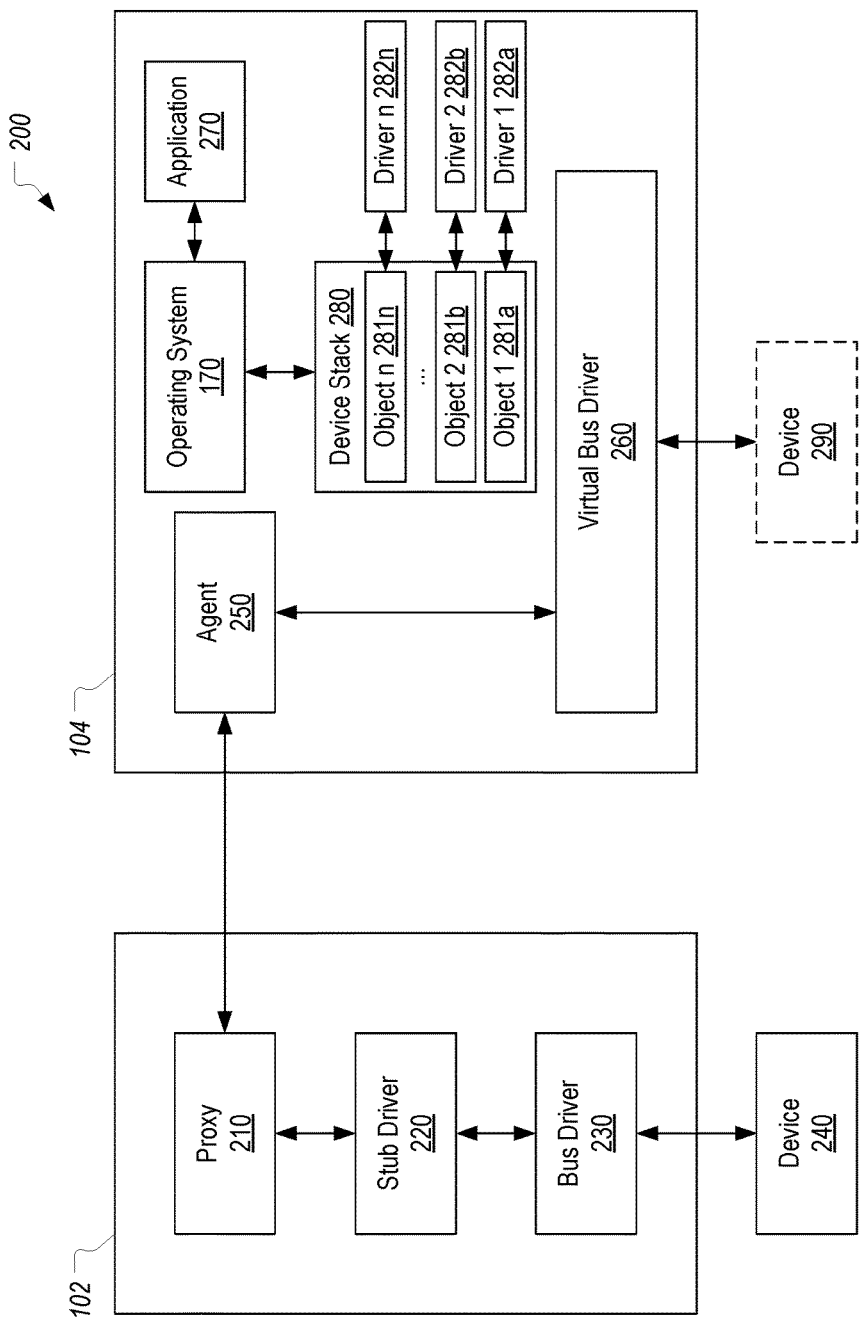
FIG. 2 illustrates how a USB device can be redirected from a client terminal to a server.
Figure 3A:
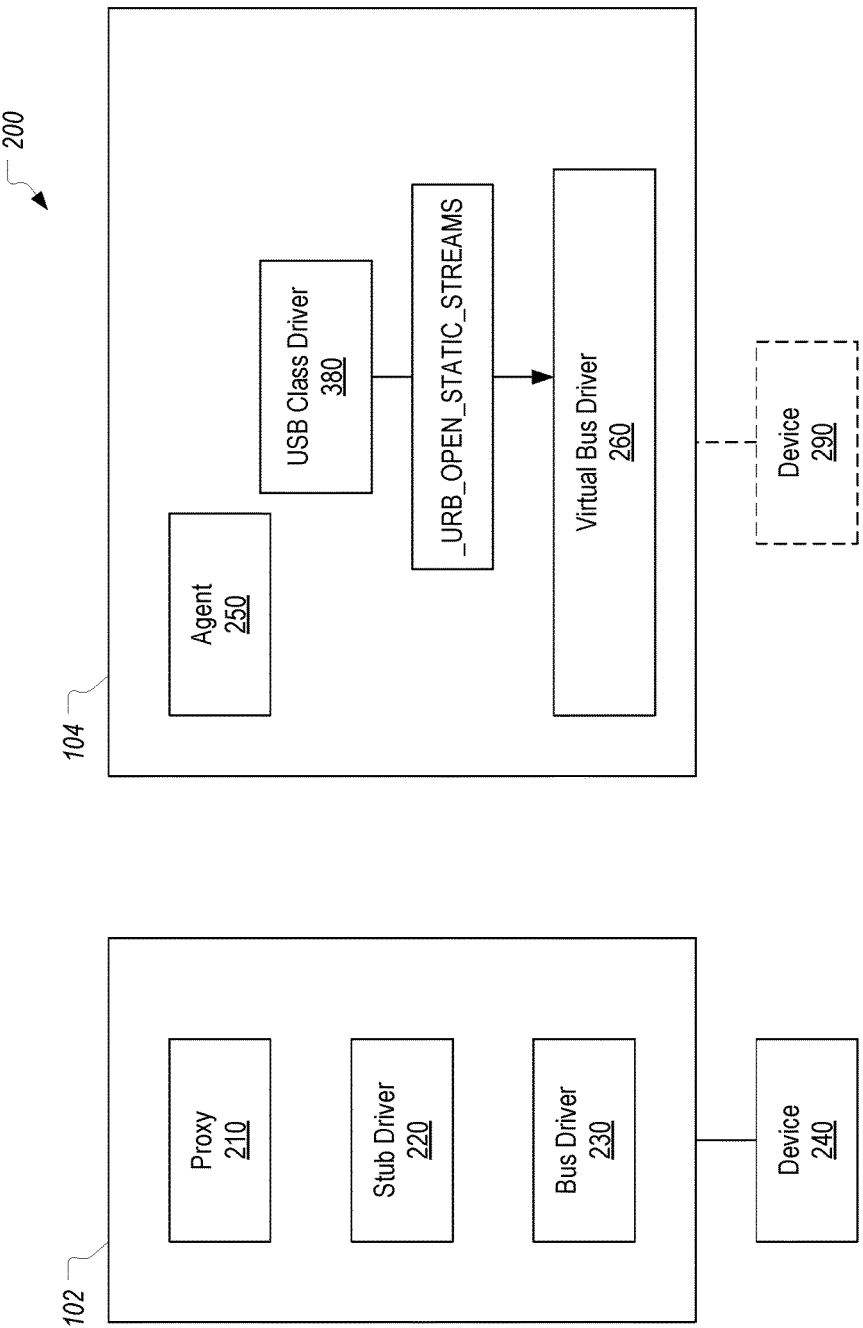
FIGS. 3A-3D illustrate how a USB 3.0 device can be redirected in accordance with prior art techniques.
Figure 3B:
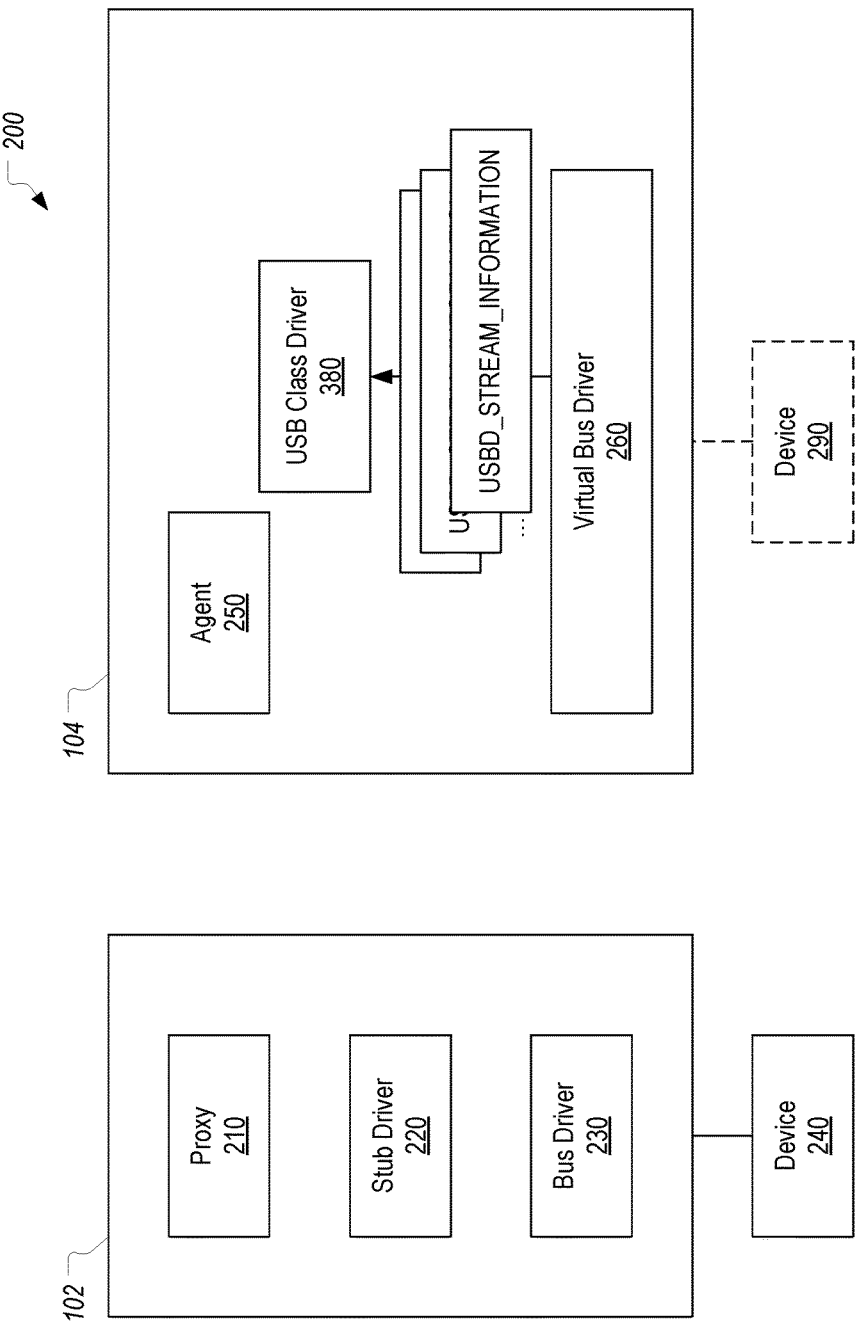
Figure 3C:
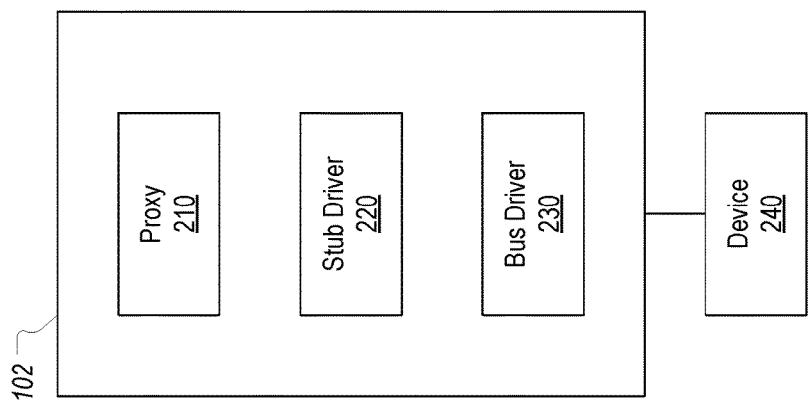
Figure 3C:
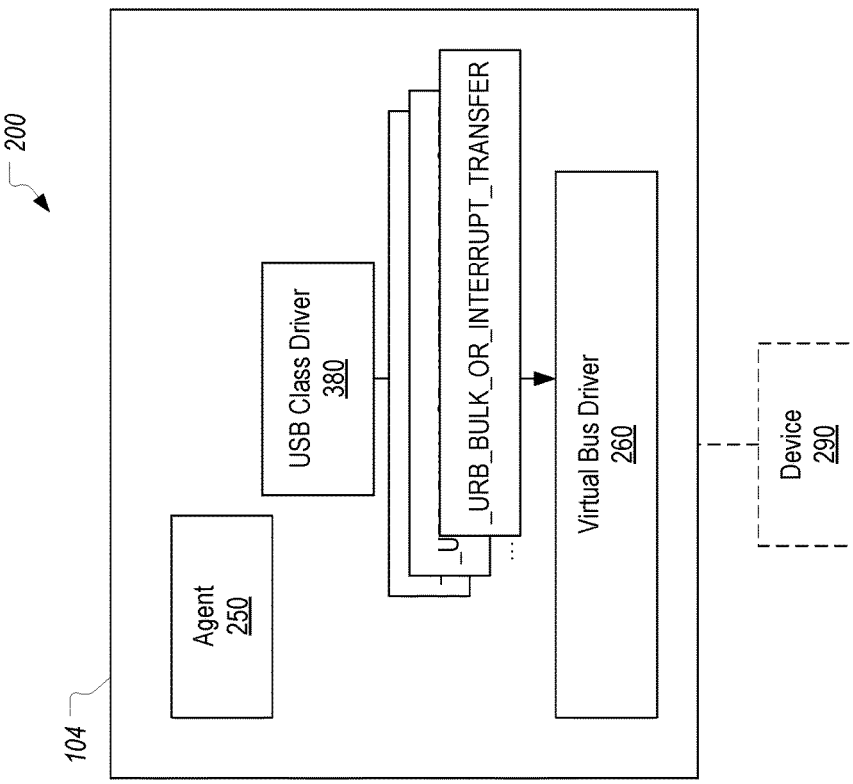
Figure 3D:
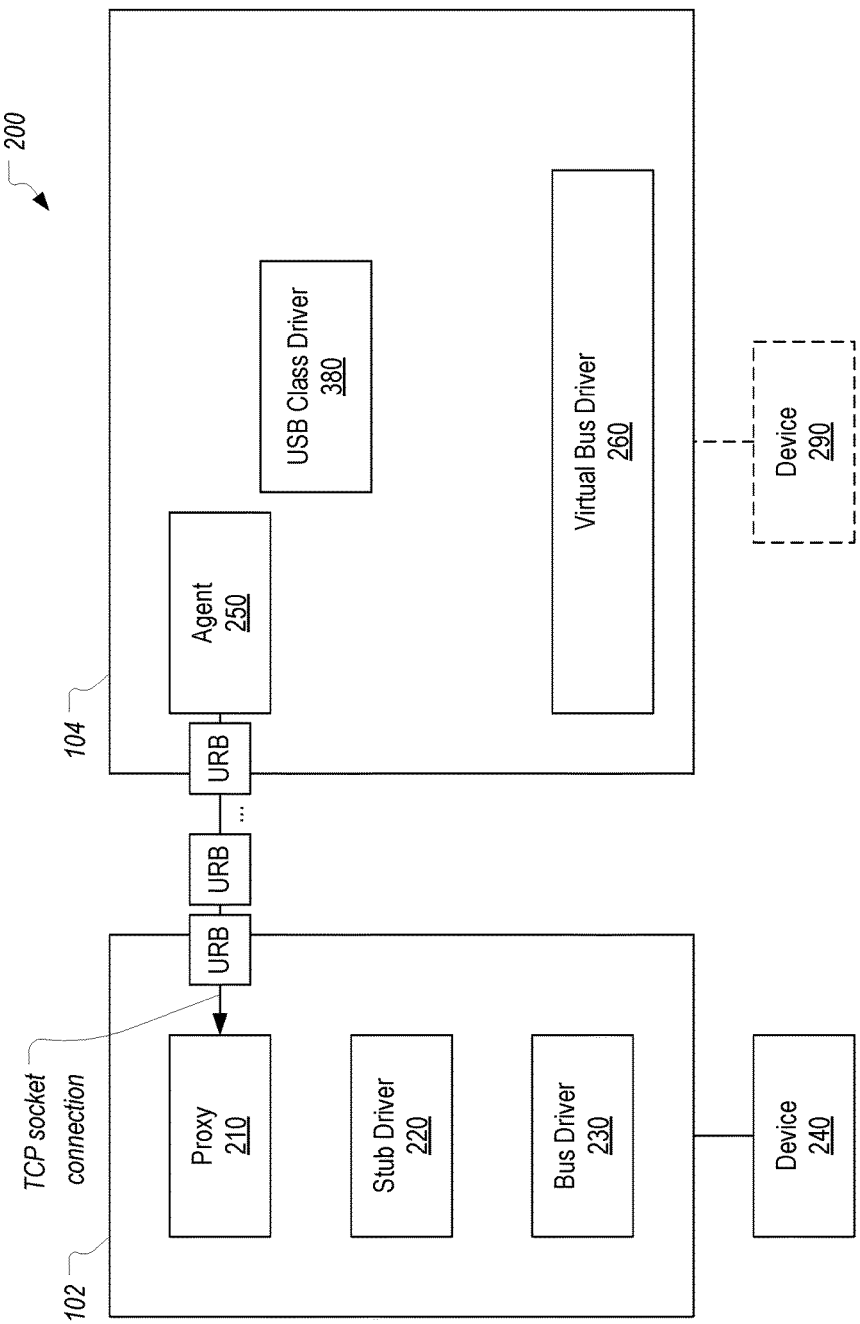
Figure 4:
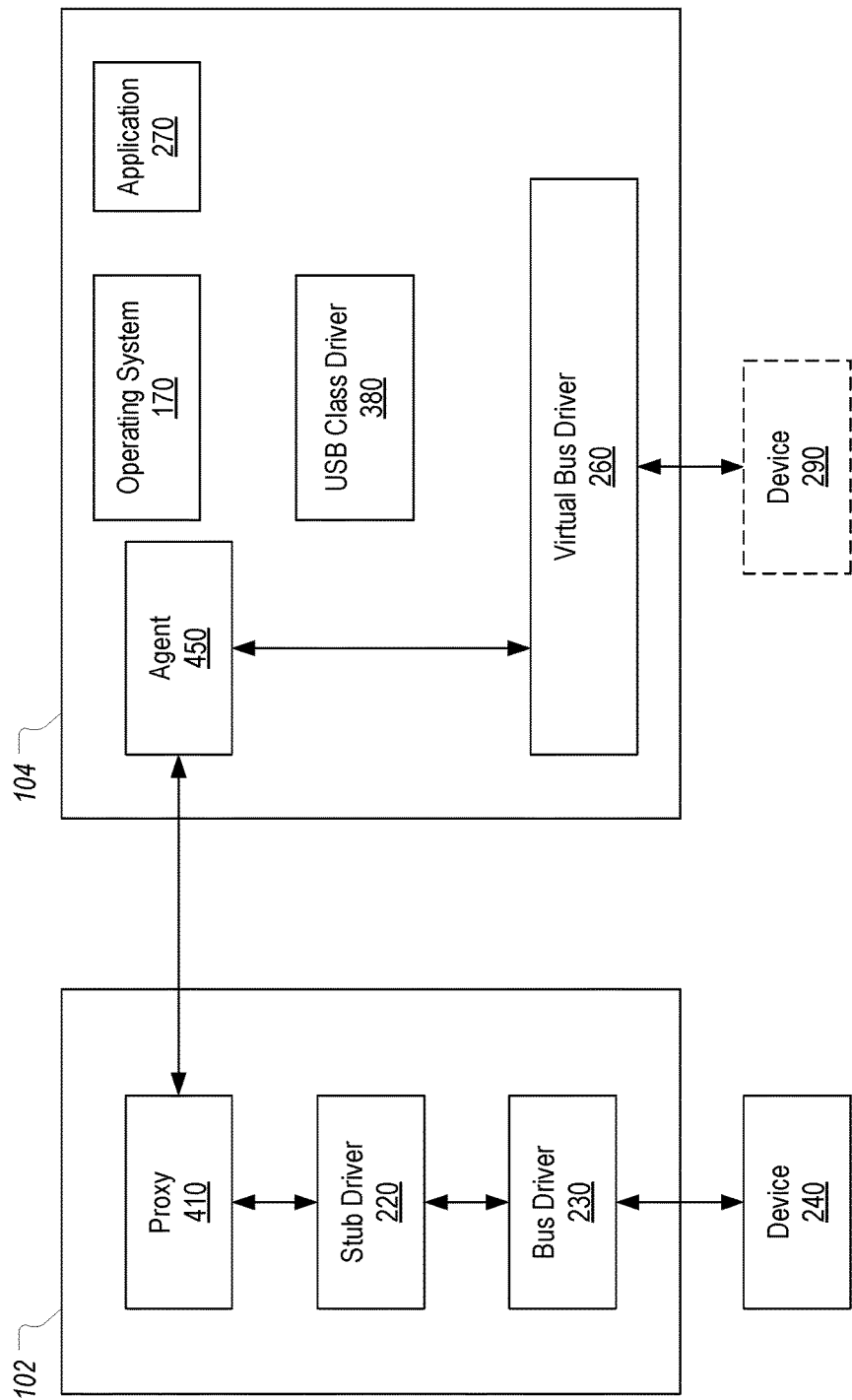
FIG. 4 illustrates an example virtual desktop infrastructure environment in which the present invention can be implemented.

FIG. 4 illustrates an example VDI environment in which the present invention can be implemented. The environment depicted in FIG. 4 is substantially the same as the environment depicted in FIGS. 2 and 3A-3D except that proxy 210 and agent 250 have been replaced with proxy 410 and agent 450 respectively. This is intended to represent that the present invention can be implemented by proxy 410 and agent 450 in existing client/server environments, and particularly, without requiring modification to operating system 170 or to the USB infrastructure.

As was described above with reference to FIG. 3A, when a server-side component desires to initiate a multi-stream transfer, USB class driver 380 (or another server-side component) will send a command to open streams in a bulk endpoint of a USB 3.0 device (i.e., will send an "open-streams request" that includes the _URB_OPEN_STATIC_STREAMS structure). Among other things, the _URB_OPEN_STATIC_STREAMS structure defines a NumberOfStreams parameter that identifies the number of streams that the server-side component would like to use to perform the transfer. Regardless of where the URB originates, the URB will be received by virtual bus driver 260, routed to agent 450, forwarded to proxy 410, and then passed down to device 240 (which is assumed to be a USB 3.0 (or higher) device).

Upon receiving the open-streams request, device 240 will configure itself appropriately (e.g., by setting up a number of endpoint packet buffers corresponding to the number of requested streams) and return a response. As was described with reference to FIG. 3B, if the open-streams request is completed successfully, the client-side USB stack will obtain "stream information" to be populated into an array of USBD_STREAM_INFORMATION structures that USB class driver 380 would have included in the open-streams request. Accordingly, when an open-streams request is completed successfully, a response that includes this stream information will be provided to proxy 410. More particularly, proxy 410 can snoop for URBs having a header with the Function field set to URB_FUNCTION_OPEN_STATIC_STREAMS and a Status field set to success and then identify the USBD_STREAM_INFORMATION structures contained therein.

Figure 5A:
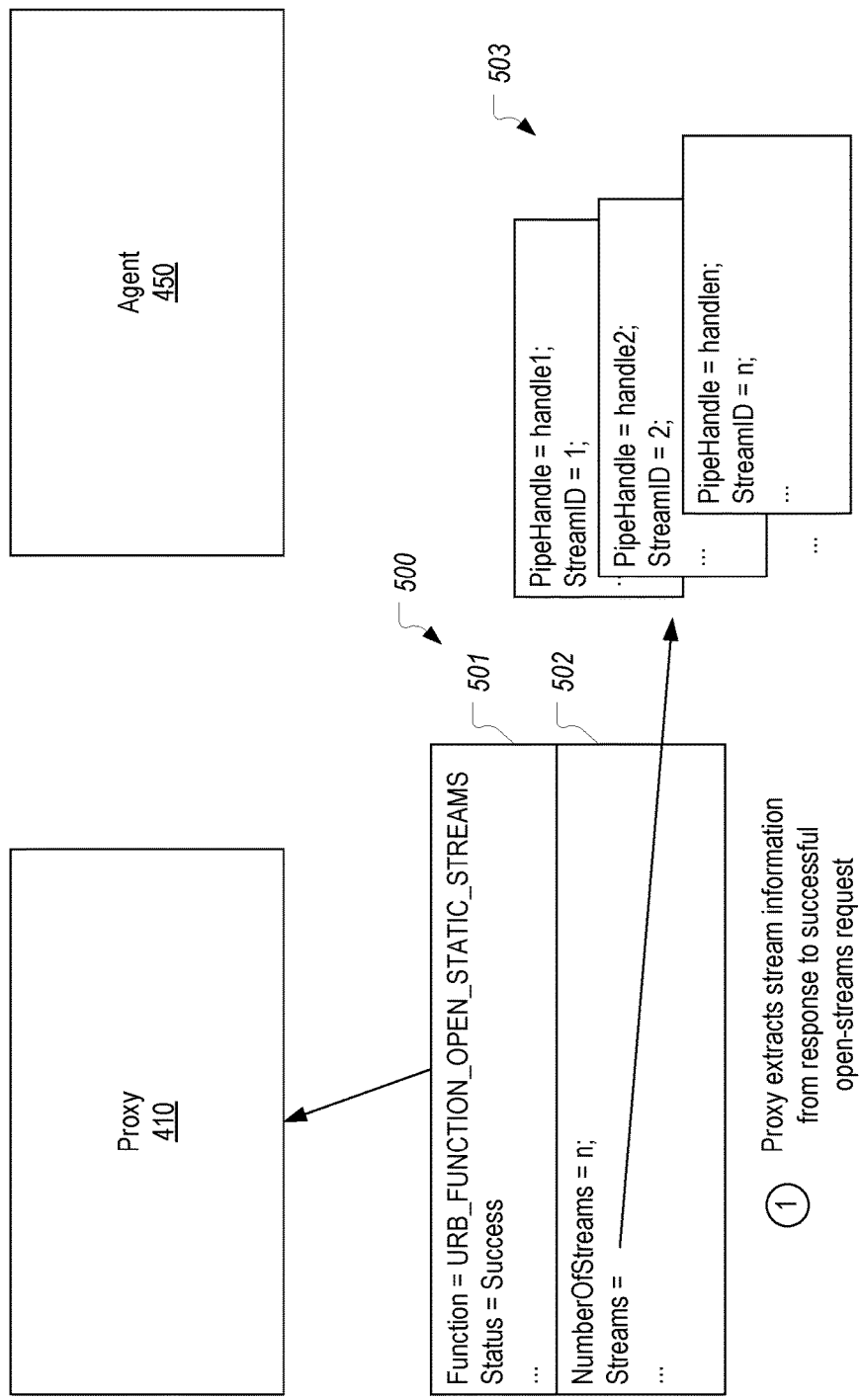
FIGS. 5A-5C illustrate how a virtual desktop infrastructure can process a request to open streams for a USB 3.0 device.
Figure 5B:
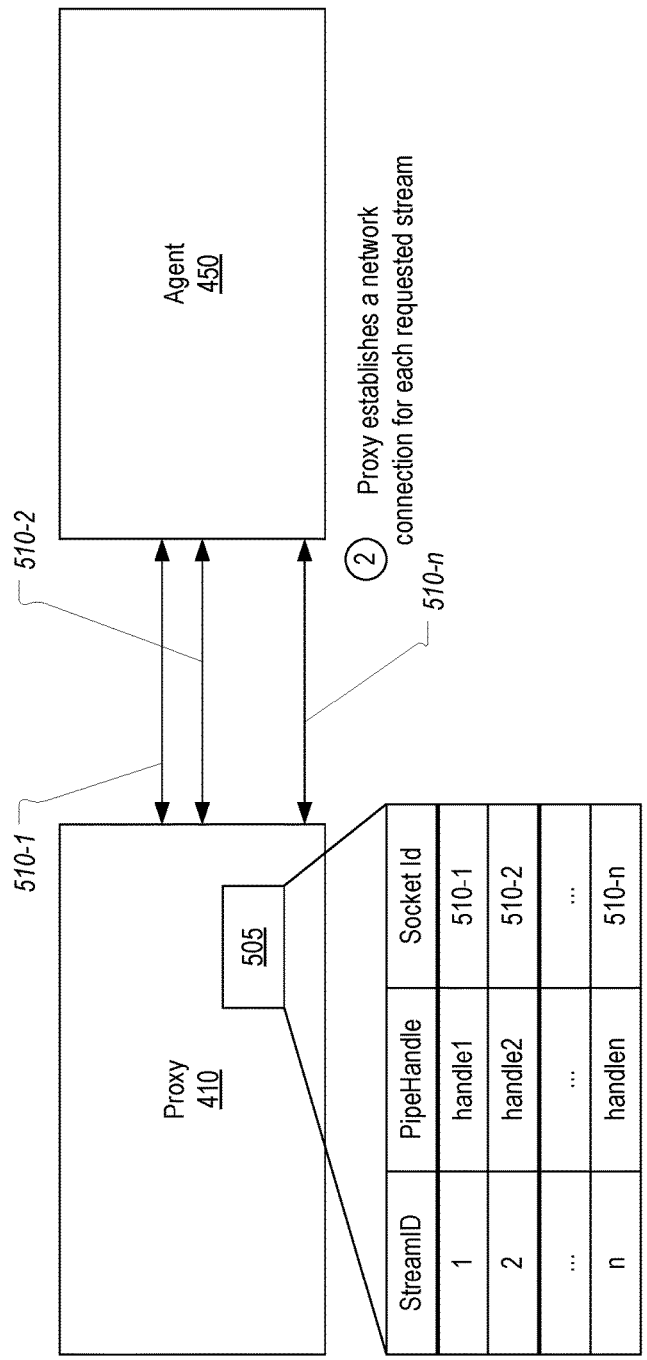
Figure 5C:
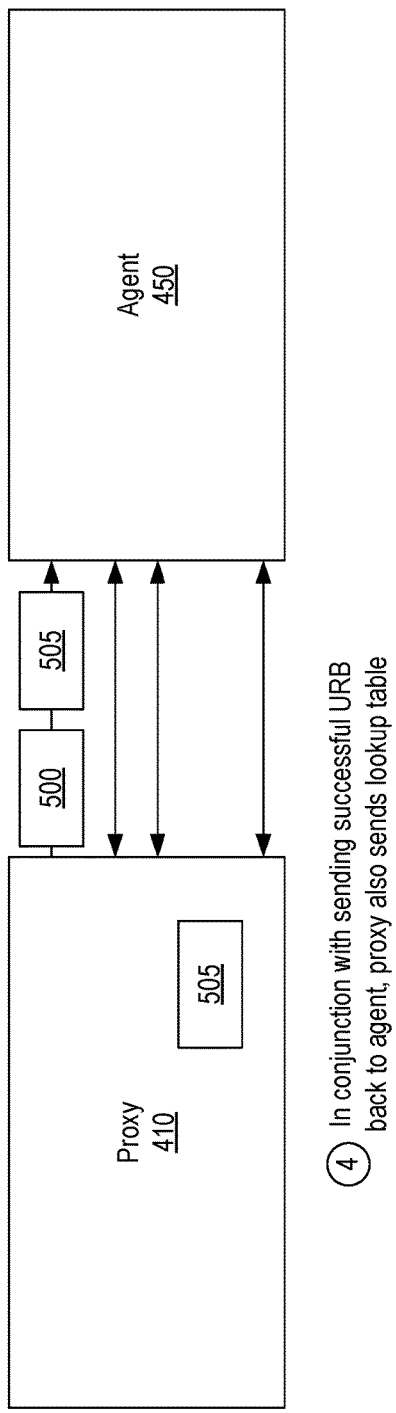

FIGS. 5A-5C illustrate an example of the processing that proxy 410 can perform upon detecting a successful open-streams request. For ease of illustration, only proxy 410 and agent 450 will be depicted in these figures. However, it is to be understood that proxy 410 and agent 450 will perform this processing in the environment depicted in FIG. 4.

In this example, it will be assumed that a server-side component has already sent an open-streams request that requests n streams (where n represents any number up to the maximum number of supported streams) and that this request has been completed successfully. Accordingly, as shown in FIG. 5A, the response that will be sent upwardly through the client-side USB stack will include a URB 500 having a header 501 that defines, among other things, the function URB_FUNCTION_OPEN_STATIC_STREAMS and a status of Success, a _URB_OPEN_STATIC_STREAMS structure 502 that defines, among other things, a value of n for the NumberOfStreams member and a pointer to an array 503 of n USBD_STREAM_INFORMATION structures for the Streams member. Also, each of the USBD_STREAM_INFORMATION structures will define, among other things, a handle (PipeHandle) to the corresponding stream and a stream identifier (StreamID).

Upon detecting the successful URB_FUNCTION_OPEN_STATIC_STREAMS URB, proxy 410, in step 1, will examine the URB to identify the number of streams that were requested (i.e., to extract the value of the NumberOfStreams member) and to obtain the stream handle and possibly the stream identifier from each USBD_STREAM_INFORMATION structure. The number of streams, stream handles and possibly stream identifiers will collectively be referred to as "stream information." Proxy 410 can cache this stream information as part of sending URB 500 to agent 450 for completion of the request (or more appropriately, as part of sending sufficient information of the URB/IRP to allow the corresponding URB on server 104 to be completed).

Proxy 410 can then use the stream information to perform two primary functions: (1) create a network connection (510-1 through 510-n) for each of the requested streams as represented as step 2 in FIG. 5B; and (2) create a lookup table 505 that matches the stream handle and possibly the identifier to the corresponding network connection as represented as step 3 in FIG. 5B. In other words, proxy 410 can create a 1:1 relationship between each USB stream and a network connection.

In typical embodiments, a network connection may be either a TCP or a UDP socket connection although any network protocol could be employed. In cases where UDP is employed, application-level reliability techniques may preferably be provided (e.g., by employing UDT or Reliable-UDP). In any case, each network connection that proxy 410 establishes can be represented by an identifier (e.g., a TCP socket ID).

After creating the network connections and the lookup table, and in conjunction with sending completed URB 500 to agent 450, proxy 410 can also send lookup table 505 to agent 450 as represented as step 4 in FIG. 5D. Agent 450 can store lookup table 505 to allow it to perform proper routing when URBs are sent to a particular stream. Although not shown, agent 450 will direct URB 500 (or the information about URB 500 that it receives) to virtual bus driver 260 which will then populate the corresponding server-side URB (i.e., recreate URB 500 on server 104) and return it to USB class driver 380 as is represented in FIG. 3B. As a result, USB class driver 380 will be able to commence sending data transfers to the particular streams.

Figure 6A:
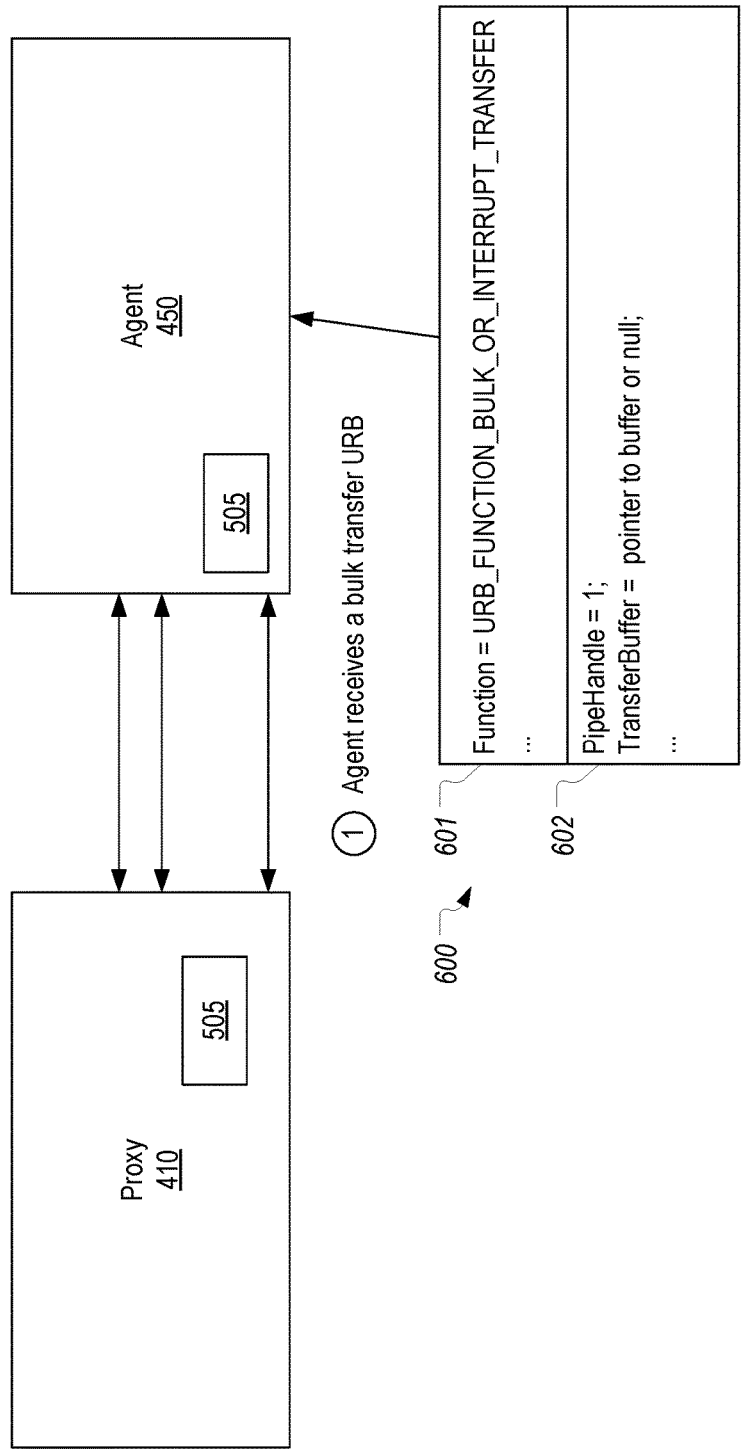
FIGS. 6A-6D illustrates how a virtual desktop infrastructure can employ a lookup table to route URBs that are sent to a particular stream over a particular network connection.
Figure 6B:
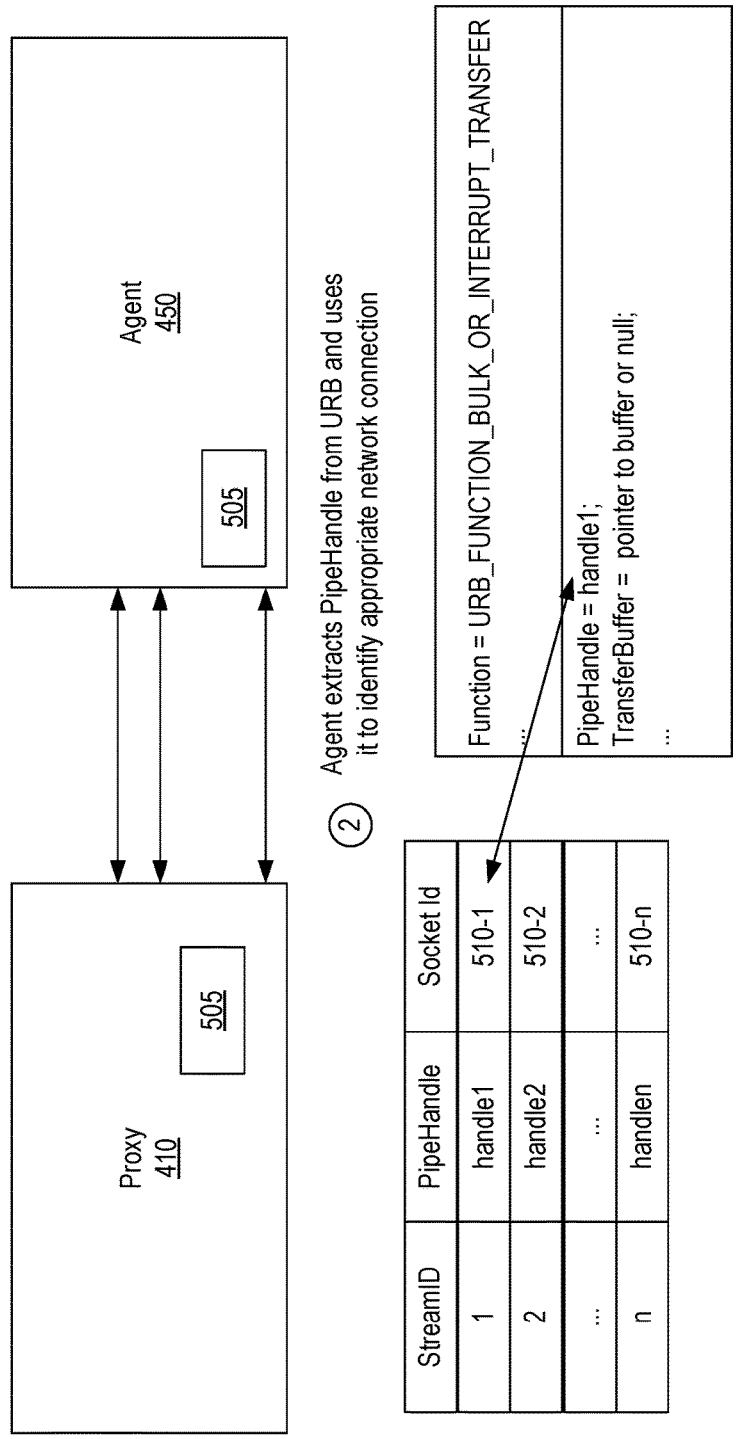

FIGS. 6A-6D illustrate how agent 450 and proxy 410 can employ lookup table 505 to route URBs that are sent to a particular stream. In FIG. 6A, it is assumed that a server-side component (e.g., class driver 380) has created a URB 600 that includes a header with the function URB_FUNCTION_BLOCK_OR_INTERRUPT_TRANSFER (which indicates that the URB is sent to a stream) and a _URB_BULK_OR_INTERRUPT_TRANSFER structure 602 which defines, among other things, the PipeHandle of the stream to which the URB is sent and a TransferBuffer (and/or TransferBufferMDL) member that is either null (in the case of a read) or that specifies a pointer to a buffer (in the case of a write). In step 1, agent 450 receives URB 600 (which is redirected by virtual bus driver 260).

Based on the Function member of URB header 601 being set to URB_FUNCTION_BLOCK_OR_INTERRUPT_TRANSFER, agent 450 can determine that the URB is intended to be sent over a stream (i.e., as part of a SuperSpeed transfer). Therefore, in step 2 shown in FIG. 6B, agent 450 can extract the handle of the stream (i.e., the value of the PipeHandle member in structure 602) and use it to lookup the network connection that is associated with the stream. In this case, the PipeHandle member is set to handle1 and lookup table 505 associates the socket Id 510-1 with handle1. Agent 450 can therefore obtain socket Id 510-1 from lookup table 505 for purposes of routing URB 600.

It is noted that if the targeted device does not support SuperSpeed, or if the URB is not a bulk transfer, agent 450 can simply send the URB using the default network connection (e.g., using the same network connection that was employed for communicating the open-streams request (URB 500)) rather than accessing lookup table 505 to attempt to locate a corresponding network connection. Also, if the URB is a bulk transfer but its handle is not included in lookup table 505, agent 450 can again use the default network connection.

Figure 6C:
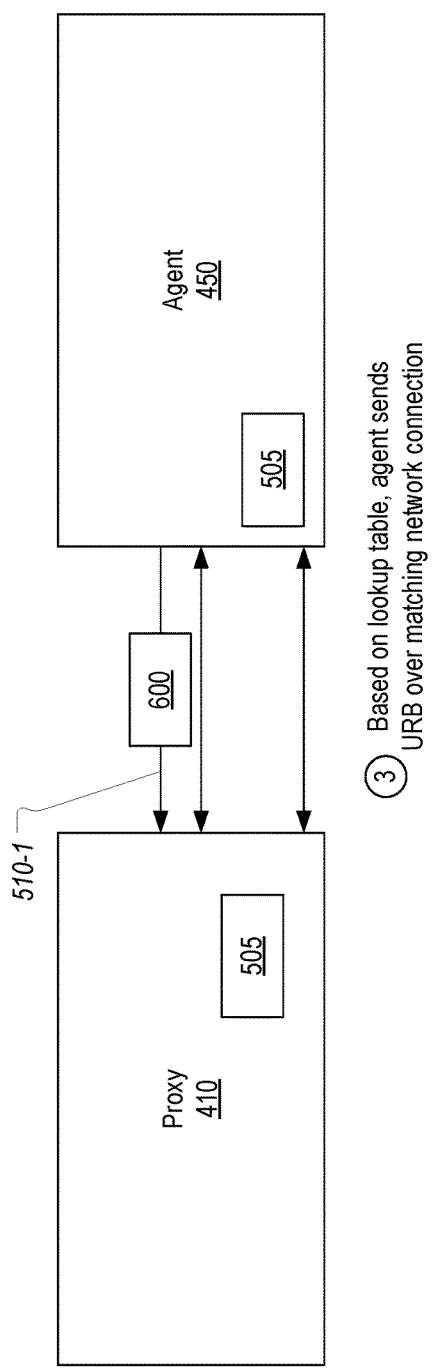

Based on lookup table 505, and as represented as step 3 in FIG. 6C, agent 450 will then send URB 600 (or information representing URB 600) to proxy 410. Importantly, based on the mappings defined in lookup table 505, agent 450 will only send URBs over network connection 510-1 if the URBs are sent to stream 1. Likewise, if a URB is sent to stream 2, agent 450 will employ lookup table 505 to determine that the URB should be routed over network connection 510-2, and so on. Accordingly, in the case of a multi-stream request in which each or all of the streams will be employed to complete a bulk transfer, all of the URBs that make up the bulk request can be transferred more efficiently. In particular, the URBs of different streams are transferred between agent 450 and proxy 410 using separate network connections thereby mimicking the multi-stream transfer at the network level. As a result, there will not be the same bottleneck as when the URBs of each stream are serialized over the same network connection. The present invention can therefore approximate USB SuperSpeed performance in a redirection environment.

Figure 6D:
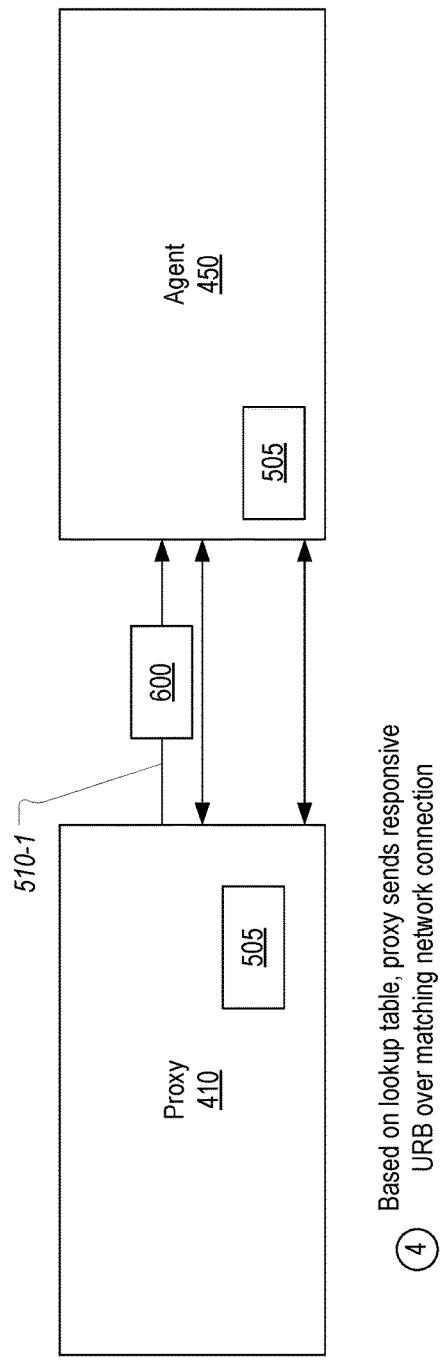

Turning now to FIG. 6D, once URB 600 has been handled, the corresponding response (also represented as URB 600) will be routed back over the same network connection 510-1. This is because proxy 410 will again employ lookup table 505 to transfer the completed URB 600. More specifically, completed URB 600 will still define a PipeHandle of handle1 which proxy 410 can employ to locate socket Id 510-1 for the purpose of returning completed URB 600 to agent 450. In other words, proxy 410 can be configured to perform the same routing functionality as described above for agent 450 but in the reverse direction.

In the case of a read request, completed URB 600 would include the data read from USB device 240, while in the case of a write request, completed URB 600 would simply reflect the status of the request. In either read or write case, "bulky" URBs will be transferred in one direction. The use of different network connections for each stream will allow the URBs to be transferred in a "parallel" and more efficient manner.

Figure 7A:
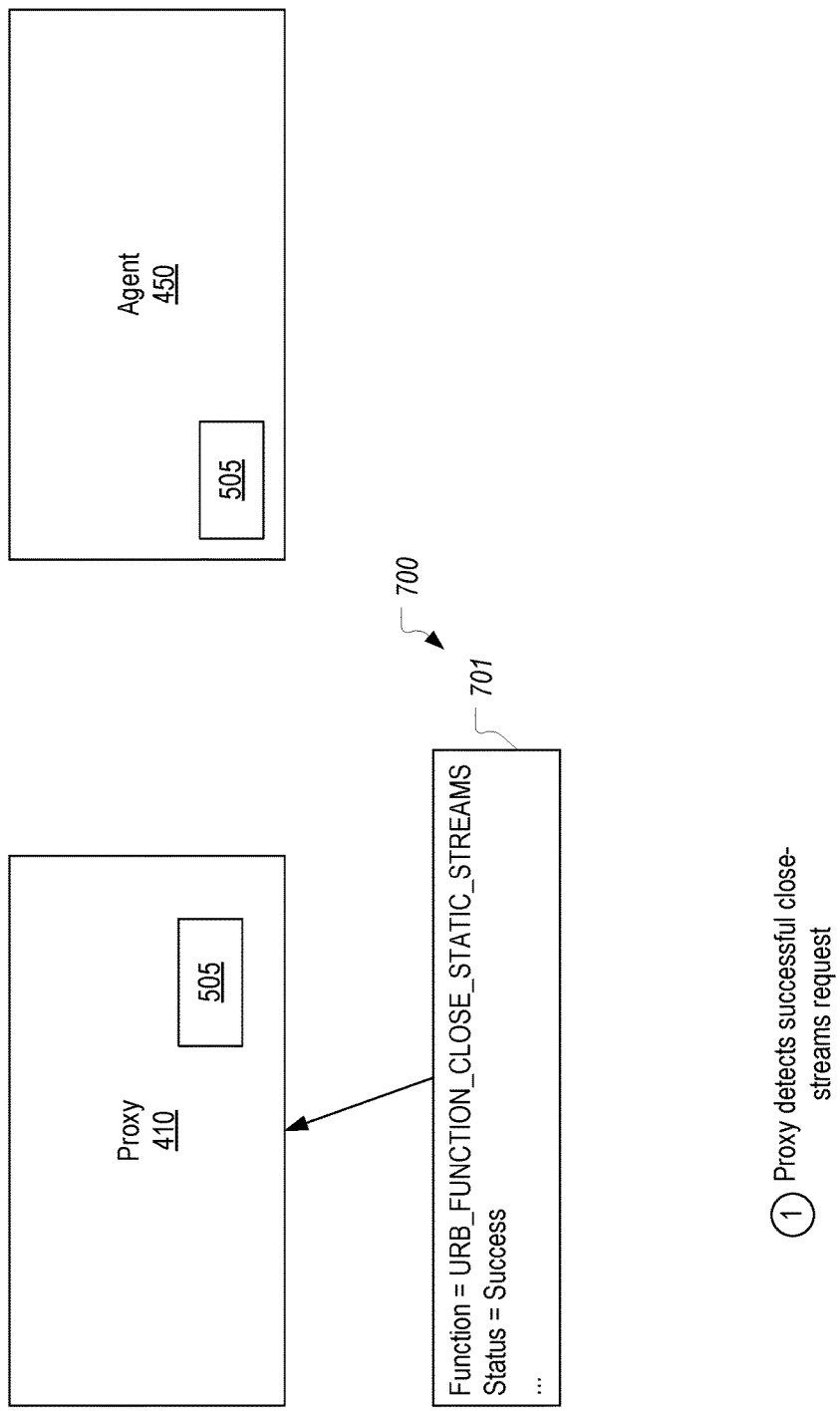
FIGS. 7A-7D illustrate how a virtual desktop infrastructure can process a request to close streams for a USB 3.0 device.
Figure 7B:
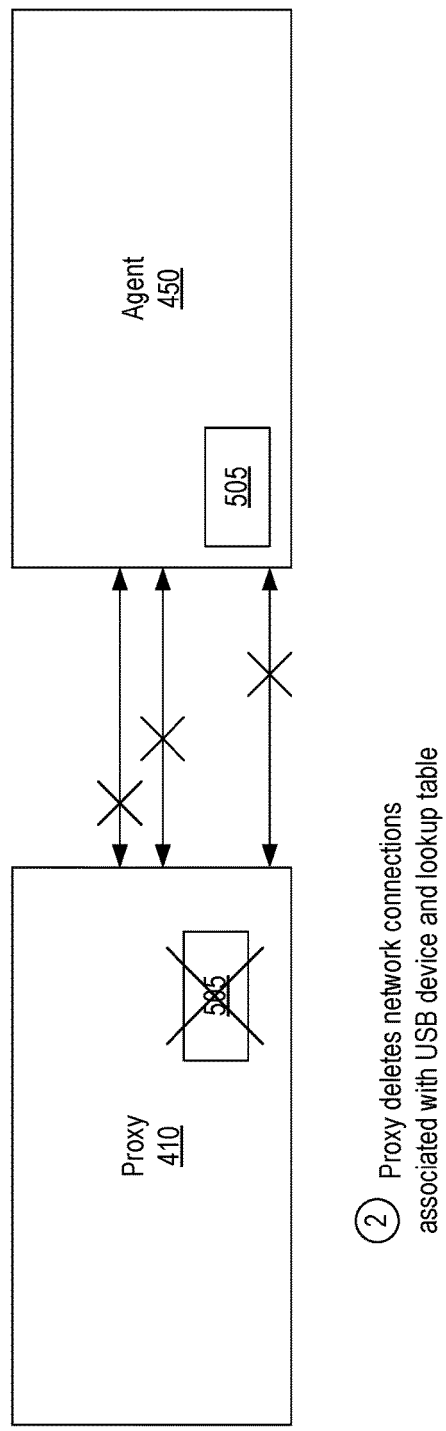
Figure 7C:
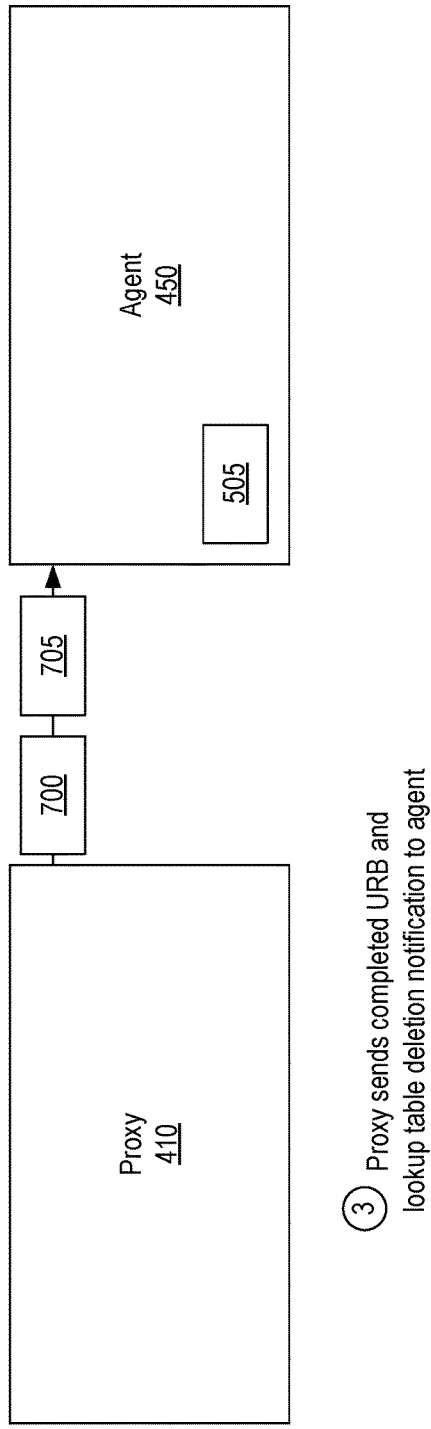

Once a multi-stream transfer is completed (or if a requested multi-stream transfer should be terminated), the server-side components (e.g., USB class driver 380) can generate a close-streams request. Proxy 410 can monitor for these close-stream requests and can perform a similar, albeit reverse, process as when open-stream requests are received. This process is represented in FIGS. 7A-7C. In FIG. 7A, it will be assumed that a URB 700 having a header 501 that defines, among other things, the function URB_FUNCTION_CLOSE_STATIC_STREAMS has been sent to USB device 240 and that a corresponding response (in the form of an updated URB 700) has been returned. Proxy 410 can be configured to monitor for such URBs that have been successfully completed as is represented in step 1 in FIG. 7A.

Although not shown, URB 700 would specify an identifier of USB device 240 (e.g., a handle to USB device 240 that is included in an accompanying _URB_PIPE_REQUEST structure). Proxy 410 can extract this identifier and use it to delete all network connections that were created for the open-streams request (i.e., all network connections that were created for USB device 240). Accordingly, although not shown, lookup table 505 can include an identifier of USB device 240.

Figure 7D:
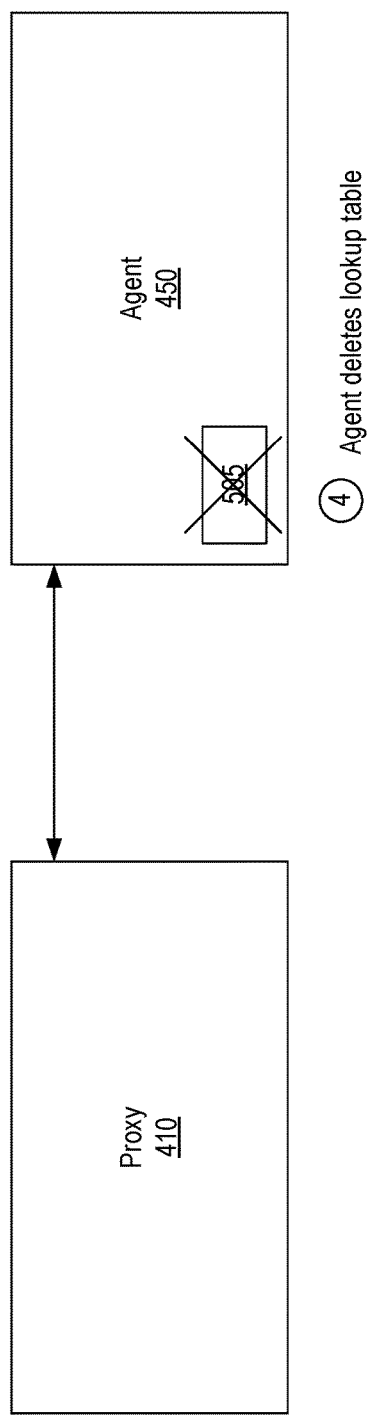

Based on an identifier of USB device 240 included with URB 700 and in response to determining that URB 700 was successful, proxy 410 can delete each network connection (510-1 through 510-n) and lookup table 505 as represented in step 2 of FIG. 7B. Additionally, in step 3 shown in FIG. 7C, proxy 410 can return completed URB 700 to agent 450 along with a notification 705 that lookup table 505 has been deleted. In response, as shown as step 4 in FIG. 7D, agent 450 can delete lookup table 505 from server 104.

It is noted that agent 450, at any given time, may maintain lookup tables for a number of different redirected devices. For example, if a number of client terminals 102 are currently redirecting SuperSpeed USB devices and applications on server 104 are concurrently performing multi-stream transfers to these devices, agent 450 can maintain a lookup table for each of these transfers. Of course, a single lookup table could be employed for all (or at least multiple) devices by including information in each entry that associates the entry with a particular device. It is also noted that proxy 410 may, at any given time, maintain more than one lookup table (or in the case of a single lookup table, entries pertaining to multiple USB devices). For example, if the client terminal 102 on which proxy 410 is executing redirects multiple SuperSpeed USB devices, proxy 410 may maintain separate lookup tables for each device.

In the case where the present invention is implemented in a software-defined networking (SDN) environment, it may be desirable to manage the set of network connections that are created for a multi-stream transfer. For example, if traffic shaping policies apply to a particular client terminal 102 (e.g., to limit bandwidth consumption), the splitting of a bulk transfer among the multiple network connections can make it difficult to apply such policies. Therefore, in some embodiments of the present invention, agent 450 may share a lookup table, or at least information defining network connections that are included in a lookup table, with the SDN controllers. For example, agent 450 could report to the SDN controller that network connections 510-1 through 510-n all pertain to the same USB stream. In such a case, the SDN controller could monitor network connections 510-1 through 510-n as a group to ensure that their combined bandwidth utilization does not violate an applicable policy.

Figure 8:
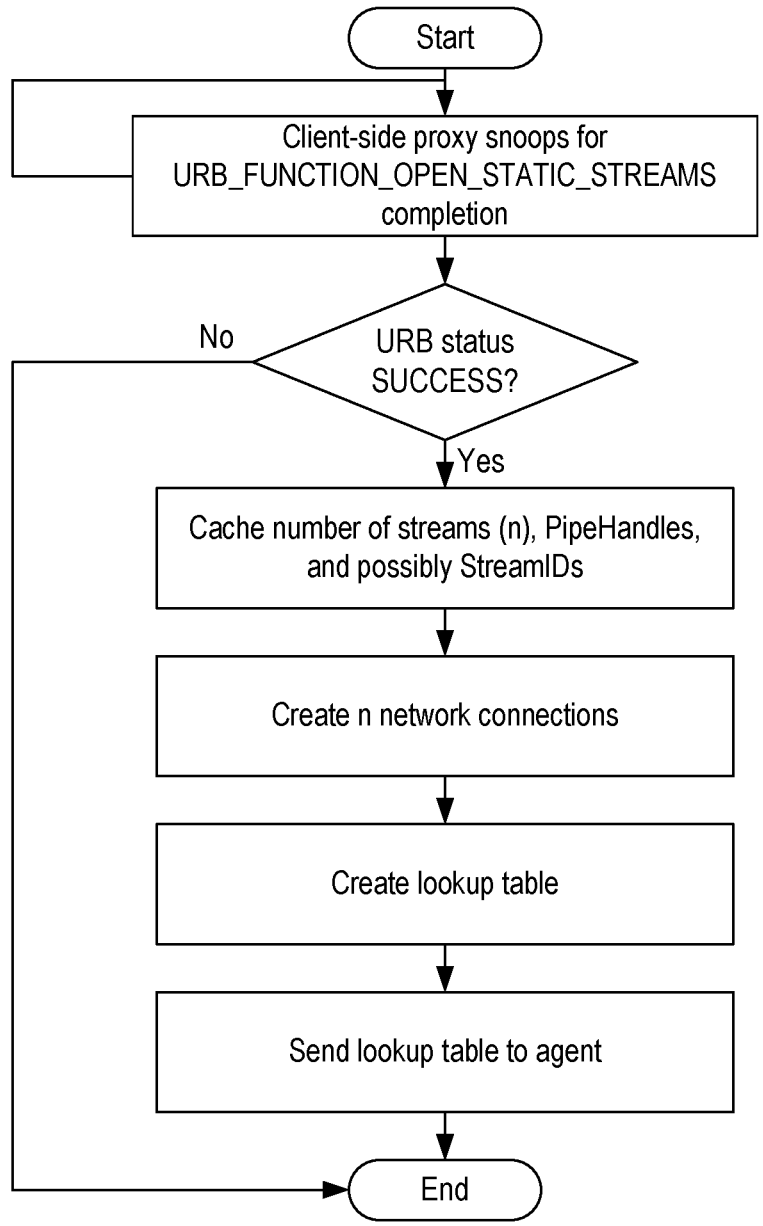
FIG. 8 provides a flow diagram of a process performed by a client-side proxy to handle a successful request to open streams for a USB 3.0 device.
Figure 9:
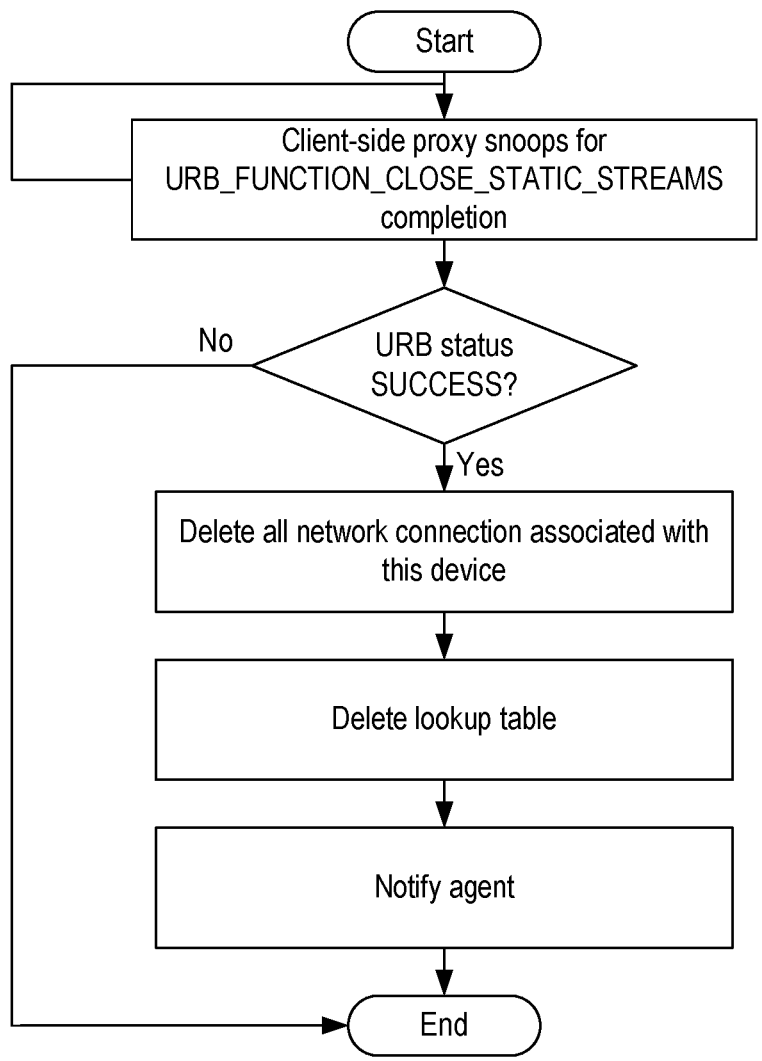
FIG. 9 provides a flow diagram of a process performed by a client-side proxy to handle a successful request to close streams for a USB 3.0 device.

FIGS. 8 and 9 provide flow diagrams depicting the functionality performed by proxy 410 to handle successful open-streams and close-streams requests respectfully. In FIG. 8, proxy 410 is first depicted as constantly monitoring for URB_FUNCTION_OPEN_STATIC_STREAMS URBs. When proxy 410 detects one, it will determine whether its status is SUCCESS. If not, proxy 410 can simply return the URB and do nothing. In contrast, if the URB was successful, proxy 410 can obtain the stream information, create the network connections for the number of streams, create the lookup table, and send the lookup table to agent 450 in the manner described above.

In FIG. 9, proxy 410 is again first depicted as constantly monitoring for URB_FUNCTION_CLOSE_STATIC STREAMS URBs. When proxy 410 detects one, it will determine whether its status is SUCCESS. If not, proxy 410 can simply return the URB and do nothing. In contrast, if the URB was successful, proxy 410 can delete all network connections associated with the device that was the target of the URB, delete the corresponding lookup table, and then notify agent 450 to do the same.

Figure 10:
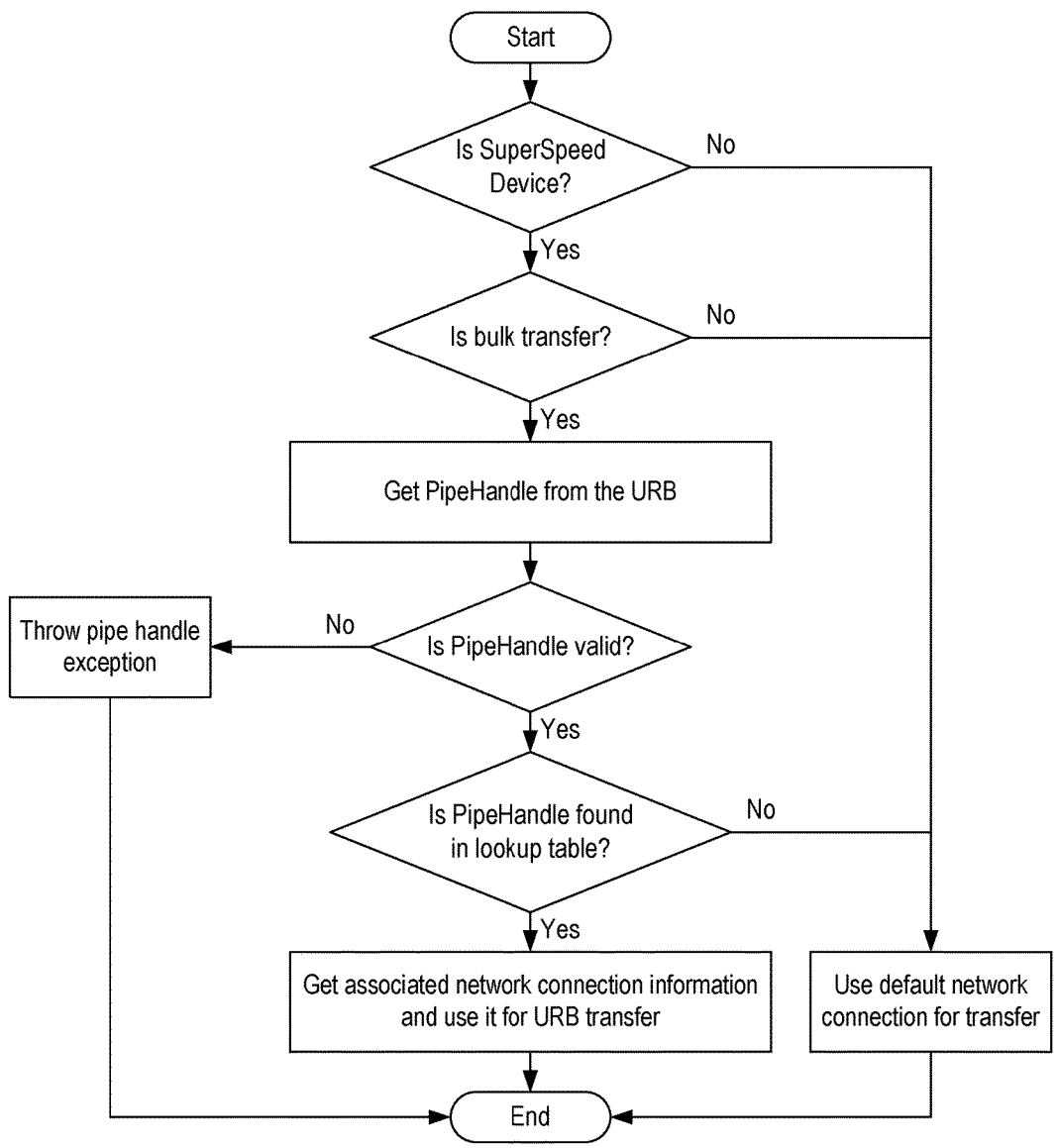
FIG. 10 provides a flow diagram of a process performed by a server-side agent to route URBs sent to a particular stream over a particular network connection.

FIG. 10 provides a flow diagram depicting the processing that agent 450 can perform when receiving a URB pertaining to a data transfer. Upon receiving a URB, agent 450 can determine whether the URB targets a SuperSpeed device, and, if not, use the default network connection to transfer the URB. IF the URB targets a SuperSpeed device, agent 450 can then determine if it pertains to a bulk transfer. If not, agent 450 can again use the default network connection to transfer the URB. If so, agent 450 can obtain the PipeHandle from the URB and determine whether it is valid. If the PipeHandle is not valid, agent 450 can throw and exception and return. However, if the PipeHandle is valid, agent 450 can search for the PipeHandle in the lookup table (i.e., in a lookup table that pertains to the targeted device). If the PipeHandle is not found, agent 450 can send the URB via the default network connection. Otherwise, agent 450 can send the URB via the network connection associated with the PipeHandle. Proxy 410 can perform similar processing on the client side to route URBs back to agent 450.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, performed in a virtual desktop infrastructure environment, for redirecting a USB device, the method comprising:
   detecting, at a client-side proxy, a successful request to open streams to a single bulk endpoint of a USB device;
   identifying, by the client-side proxy and from the request, a number of streams to be opened to the single bulk endpoint of the USB device, the number of streams comprising at least two streams;
   creating, by the client-side proxy and for each of the number of streams, a network connection; and
   creating, by the client-side proxy, a lookup table that associates each stream with a particular network connection such that a separate network connection is created for and associated with each of the number of streams to the single bulk endpoint of the USB device.

2. The method of claim 1, further comprising:
   sending the lookup table to a server-side agent.

3. The method of claim 1, wherein detecting a successful request to open streams to the single bulk endpoint of the USB device comprises detecting a USB request block that defines the URB_FUNCTION_OPEN_STATIC_STREAMS function.

4. The method of claim 1, wherein identifying the number of streams to be opened comprises identifying a value of a Streams member in a _URB_OPEN_STATIC_STREAMS structure.

5. The method of claim 1, wherein the networks connections comprise TCP or UDP connections.

6. The method of claim 1, further comprising:
   identifying, from the request and for each of the number of streams, a handle to the stream.

7. The method of claim 2, further comprising:
   receiving, at the agent, a URB that is sent to a particular stream;
   accessing the lookup table to identify the network connection that is associated with the particular stream; and
   sending the URB over the identified network connection.

8. The method of claim 2, further comprising:
   detecting, at the proxy, a successful request to close streams to the single bulk endpoint of the USB device; and
   deleting the network connections that were created for the number of streams.

9. The method of claim 6, wherein the lookup table associates each stream with the particular network connection by associating the handle to each stream with an identifier of the particular network connection.

10. The method of claim 6, wherein the handles are obtained from an array of USBD_STREAM_INFORMATION structures.

11. The method of claim 7, further comprising:
   receiving, at the proxy, a response to the URB;
   accessing the lookup table to identify the network connection that is associated with the particular stream; and
   sending the response to the URB over the identified network to the agent.

12. The method of claim 8, further comprising:
   deleting, by the proxy, the lookup table;
   notifying the agent that the lookup table has been deleted; and
   deleting, by the agent, the lookup table.

13. The method of claim 8, wherein detecting a successful request to close streams to the single bulk endpoint of the USB device comprises detecting a USB request block that defines the URB_FUNCTION_CLOSE_STATIC_STREAMS function.

14. One or more computer storage media storing computer executable instructions which when executed by one or processors implement a virtual desktop infrastructure comprising:
   a client-side proxy; and
   a server-side agent;
   wherein the proxy is configured to communicate over a network with the agent for the purpose of redirecting a USB device to the server including:
      detecting a successful request to open streams to a single bulk endpoint of the USB device;
      identifying, from the request, a number of streams to be opened to the single bulk endpoint of the USB device, the number of streams comprising at least two streams;
      creating, for each of the number of streams, a network connection;
      creating a lookup table that associates each stream with a particular network connection such that a separate network connection is created for and associated with each of the number of streams to the single bulk endpoint of the USB device; and
      sending the lookup table to the agent.

15. The computer storage media of claim 14, wherein the proxy is further configured to:
   detect a successful request to close streams to the single bulk endpoint of the USB device;
   delete the network connections created for the number of streams; and
   notify the agent of the deletion.

16. The computer storage media of claim 14, wherein the agent is configured to:
   receive a URB that is sent to a particular stream;
   identify, from the lookup table, the particular network connection that is associated with the particular stream; and
   send the URB over the particular network connection.

17. The computer storage media of claim 16, wherein the lookup table associates a handle of each stream with an identifier of the particular network connection.

18. One or more computer storage media storing computer executable instructions which when executed by one or processors implement a virtual desktop infrastructure comprising:
   a client-side proxy; and
   a server-side agent;
   wherein the agent is configured to communicate over a network with the proxy for the purpose of redirecting a USB device to the server including:
      receiving, from the proxy, a lookup table that associates each of a plurality of network connections with a particular stream of a plurality of streams that are opened for a single bulk endpoint of the USB device;
      receiving a URB that is sent to a particular stream;
      accessing the lookup table to identify the network connection that is associated with the particular stream; and
      sending the URB over the identified network connection.

19. The computer storage media of claim 18, wherein the proxy is configured to create the lookup table using stream information obtained from a successful request to open streams to the single bulk endpoint of the USB device.

20. The computer storage media of claim 18, wherein the proxy is configured to delete the network connections identified in the lookup table in response to a successful request to close streams to the single bulk endpoint of the USB device.

* * * * *